US006964331B1

(12) United States Patent
Kerr

(10) Patent No.: US 6,964,331 B1
(45) Date of Patent: Nov. 15, 2005

(54) CANTILEVER MOUNTED ROTARY BRUSH CONVEYOR BELT CLEANER

(75) Inventor: James F. Kerr, Croswell, MI (US)

(73) Assignee: Material Control, Inc., Croswell, MI (US)

(*) Notice: Subject to any disclaimer, the term of this patent is extended or adjusted under 35 U.S.C. 154(b) by 0 days.

(21) Appl. No.: 10/885,176

(22) Filed: Jul. 6, 2004

(51) Int. Cl.[7] ............................................. B65G 45/00
(52) U.S. Cl. ..................................................... 198/496
(58) Field of Search ........................................ 198/496

(56) References Cited

U.S. PATENT DOCUMENTS

| | | | |
|---|---|---|---|
| 3,139,975 A * | 7/1964 | Schaefer ..................... | 198/496 |
| 3,862,682 A * | 1/1975 | Russell ........................ | 198/496 |
| 3,957,155 A | 5/1976 | Enchelmaier | |
| 4,199,840 A | 4/1980 | Crane | |
| 4,960,200 A | 10/1990 | Pierce | |
| 5,058,728 A | 10/1991 | Leiweke et al. | |
| 5,400,897 A * | 3/1995 | Doyle ......................... | 198/496 |
| 5,497,872 A * | 3/1996 | Pennino ...................... | 198/498 |
| 5,542,525 A | 8/1996 | Kornely | |
| 5,649,616 A * | 7/1997 | Stecklow ..................... | 198/496 |
| 5,711,050 A * | 1/1998 | Pimentel ..................... | 15/302 |
| 6,170,293 B1 * | 1/2001 | Cody .......................... | 65/168 |
| 6,189,681 B1 * | 2/2001 | England ...................... | 198/496 |
| 6,250,476 B1 | 6/2001 | Kroon et al. | |

OTHER PUBLICATIONS

"Conveyor Belt Cleaners", Conveyor Components Company, 130 Seltzer Road, Croswell, Michigan, Bulletin No. C-228, 1985, 20 Pages.

"Conveyor Belt Cleaners", Conveyor Components Company, 130 Seltzer Road, Croswell, Michigan, Bulletin No. C-251, 16 Pages.

* cited by examiner

Primary Examiner—Joe Dillon, Jr.
(74) Attorney, Agent, or Firm—Dykema Gossett PLLC

(57) ABSTRACT

The cantilever mounted rotary brush conveyor belt cleaner is mounted on one side of a conveyor apparatus, with the rotary brush extending beneath the head pulley and the return strand of the belt to remove foreign material adhering to the belt. The unit includes a shaft and a rotary brush mounted on the shaft, with a bearing support assembly supporting one end of the shaft and with the other end being unsupported. A frame assembly has a mounting plate which is fixed to the support or frame of the conveyor. The frame has a mounting plate with a rectangular opening therein through which the shaft and the rotary brush extends. The bearing support assembly is located on and abuts one of the surfaces of the mounting plate, with the rotary brush being located opposite the other surface of the mounting plate. The frame assembly includes a pair of vertically extending laterally spaced angle brackets for enclosing the opposing edges of the bearing support assembly, with the angle brackets being secured to the mounting plate to hold the bearing assembly in a stationary position against the mounting plate. Power means are provided for rotating the shaft and the rotating brush. With such a construction, the unit is mounted on one side of the conveyor apparatus, adjustments are made from one side and the unit is serviced from one side of the conveyor belt. Temporary tube supports are placed under the brush to assist in the installation, removal and/or replacement thereof.

19 Claims, 8 Drawing Sheets

CANTILEVER MOUNTED ROTARY BRUSH CONVEYOR BELT CLEANER

BACKGROUND OF THE INVENTION

1. Field of the Invention

A rotary brush type belt cleaner is utilized in a conveyor apparatus having an endless conveyor belt trained about a pair of pulleys or rollers for removing from the conveyor belt abrasive and/or foreign materials. Because of the tendency of the belt to accumulate adhering material, it is common place to provide the rotary brush conveyor belt cleaner beneath the head pulley and the return strand of the belt to remove this material.

2. Descriptions of the Prior Art

It is well known in the prior art to provide a rotary brush conveyor belt cleaner having a longitudinally extending hub including a pair of end hubs in which are mounted, as an example, twelve helically shaped radially extending replaceable brush strips. The hubs are mounted on a shaft(s), with the ends of the shaft supported by bearings located on the support structure or frame of the apparatus. An electric motor and a belt driven drive sheave are provided to rotate the brush as is illustrated in FIG. 1. With such a structure, access is generally provided at each side of the conveyor apparatus to permit the mechanic to remove the brush and shaft(s) from the bearing assemblies in order to replace or to repair the brush. In some environments, it is extremely difficult to reach both ends of the rotary brush because of the limited space at one side of the conveyor apparatus. As an example, the conveyor apparatus may be located in close proximity to a wall of a factory. Thus, the prior art rotary brush conveyor belt cleaner illustrated in FIG. 1 cannot be conveniently installed on a conveyor apparatus where there is limited space on one side of the apparatus.

The aforementioned prior art rotary brush conveyor belt cleaner while generally satisfactory when sufficient room is provided on both sides of the conveyor apparatus cannot be easily used, assembled, disassembled and maintained when space is only available on one side of the conveyor apparatus.

SUMMARY OF THE INVENTION

The present invention, directed to a cantilever mounted rotary brush conveyor belt cleaner, has certain structural, economical and functional advantages over the prior art device described previously.

It is a feature of the present invention to provide a conveyor apparatus including a frame or support, with a pair of drums or pulleys carried by the support, an endless conveyor belt having upper and lower runs extending around the pulleys and a cantilevered mounted rotary brush conveyor belt cleaner assembly mounted on one side of the support and extending below and across the lower run of the conveyor belt, with the cantilevered rotary brush conveyor belt cleaner assembly having a shaft with a pair of ends and a rotary brush mounted on the shaft. A bearing support assembly supports one end of the shaft, with the other end of the shaft being unsupported. With such a construction the rotary brush and shaft extends transversely across and below the lower run for engaging and cleaning the lower run of the endless conveyor belt.

Another feature of the present invention is to provide a conveyor apparatus of the aforementioned type wherein the cantilever rotary brush conveyor belt cleaner assembly has a frame assembly including a mounting plate connected to the support at one side of the conveyor apparatus. The mounting plate has a rectangular opening through which the brush assembly extends for engaging the lower run of the endless conveyor belt. The bearing support assembly is located on and abuts one side of the mounting plate. The frame assembly includes a pair of vertically extending laterally spaced angle brackets for enclosing opposing edges of the bearing support assembly. The angle brackets are secured to the mounting plate to hold the bearing assembly in a stationary position.

Still another feature of the present invention is to provide a conveyor apparatus of the aforementioned type wherein the rotary brush includes a plurality of spaced apart bristles extending lengthwise of the shaft and arranged on a helix.

A further feature of the present invention is to provide a conveyor apparatus of the aforementioned type wherein the bottom of the mounting plate below the rectangular opening is provided with a pair of relatively short tubular inserts which extend through the mounting plate, with the tubular inserts receiving installation tubes which are temporarily mounted therein for assisting or guiding the rotary brush and shaft through the rectangular opening, beneath the lower run of the endless conveyor belt. The installation tubes are removed from the tubular inserts after the rotary brush and the bearing support assembly have been installed and the angle brackets of the frame assembly have been secured to the mounting plate.

A still further feature of the present invention is to provide a conveyor apparatus of the aforementioned type wherein the frame assembly is located on the support directly under or near the centerline of the head pulley. Power means including an electric motor is carried by the frame assembly, with the motor having a belt driven connection to the shaft for rotating the shaft and the rotary brush.

Another feature of the present invention is to provide a conveyor apparatus of the aforementioned type wherein a threaded nut is fixed to the frame assembly below the bearing assembly and a vertically extending and moveable adjustment screw is adjustably carried by the nut of the frame assembly. The top of the screw abuts the bottom of the bearing support assembly. Adjustment of the screw up or down varies the height and position of the bearing assembly thereby adjusting the pressure of the rotary brush on the endless conveyor belt.

Still another feature of the present invention is to provide a conveyor apparatus of the aforementioned type wherein a portion of the mounting plate below the rectangular opening is provided with a pair of tubular mounting elements and a motor support assembly including an arm which is received in one of the mounting elements depending on which side of the conveyor the rotary brush conveyor belt cleaner is mounted. The motor support assembly has a tubular sleeve mounted on the arm, with the sleeve having a motor mount plate. The electric motor is secured to the mount plate.

A further feature of the present invention is to provide a cantilever mounted rotary brush conveyor belt cleaner of the aforementioned type wherein a removable leverage tube is provided which may be placed over the end of the shaft adjacent the bearing assembly to assist along with the installation tubes in installing or removing the bearing support assembly and the cantilever mounted rotary brush.

Still another feature of the present invention is to provide a cantilever mounted rotary brush conveyor belt cleaner of the aforementioned type when adjustive means are providing for varying the biasing force or the effectiveness of the rotary brush on the conveyor belt.

These together with other features and advantages which will become subsequently apparent reside in the details of construction and operation as more fully hereinafter described and claimed, reference being had to the accompanying drawings forming a part of this application for patent.

IN THE DRAWINGS

DETAILED DESCRIPTION OF THE PREFERRED EMBODIMENT OF THE PRESENT INVENTION

Figure 1:
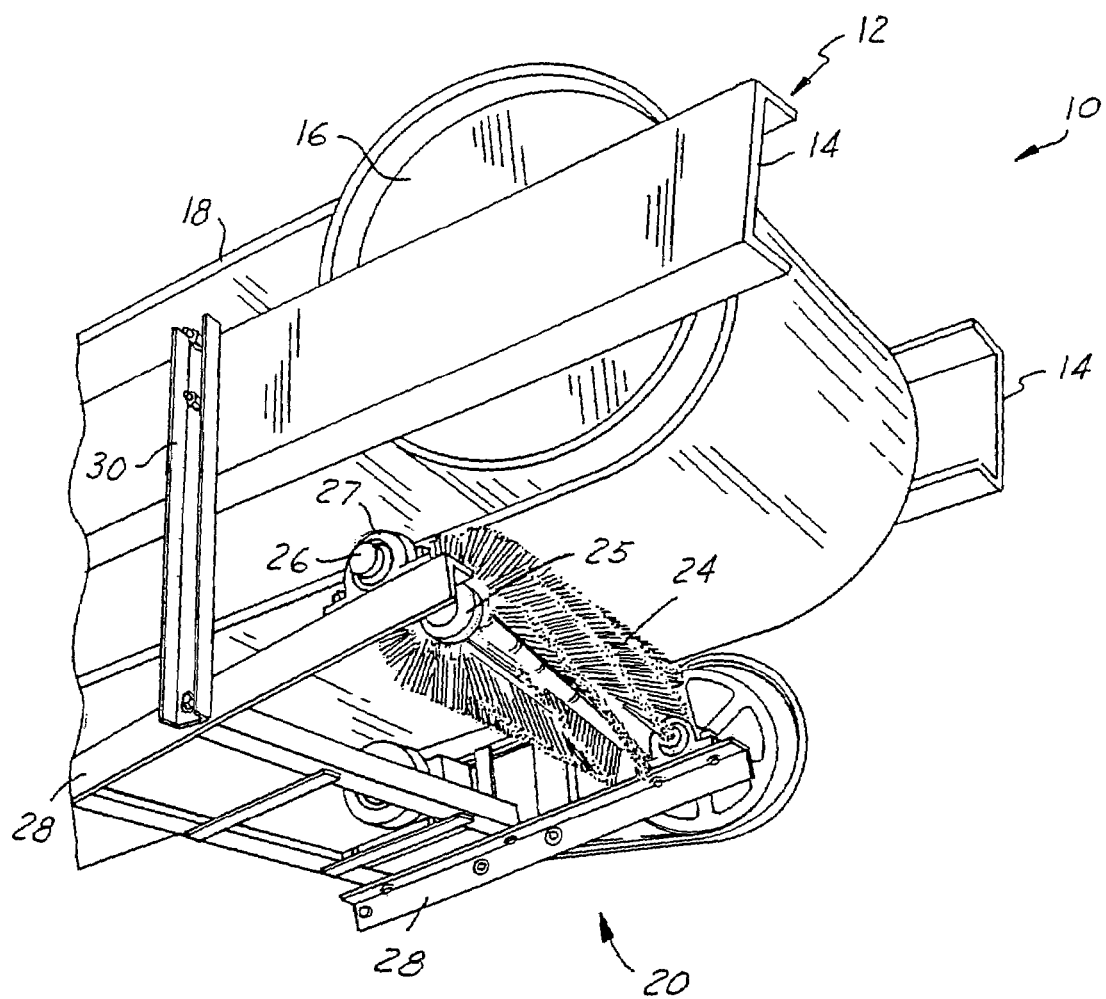
FIG. 1 is a fragmentary perspective view of a conveyor apparatus having a prior art rotary brush conveyor belt cleaner mounted beneath the return run of the conveyor belt.

FIG. 1 illustrates a prior art conveyor apparatus 10 including a support or frame 12 having a pair of longitudinally extending laterally spaced apart channel members 14. At the ends of the frame 12 are mounted a pair of drums or pulleys 16, with only the head pulley 16 being illustrated. An endless conveyor belt 18 is entrained about the pulleys or drums 16. Power means, not shown, are provided for driving pulleys 16 and conveyor belt 18. In order to clean debris or to remove foreign materials from the conveyor belt 18, a rotary brush conveyor belt cleaner 20 is mounted below the return run of the conveyor belt 18 as shown in FIG. 1. Rotary brush conveyor belt cleaner 20 includes a plurality of spaced apart hubs 25 which carry the radially spaced, longitudinally extending bristles or strips 24 of the rotary brush. End hubs 25 are provided with shafts 26 which are carried by bearings 27 mounted on the angle brackets 28. The angle brackets 28 are attached to the channel members 14 by vertical brackets 30. The prior art rotary brush conveyor belt cleaner 20 has the ends of the shafts 26 mounted in the bearings 27 and supported beneath the return run of the endless conveyor belt 18.

Figure 2:
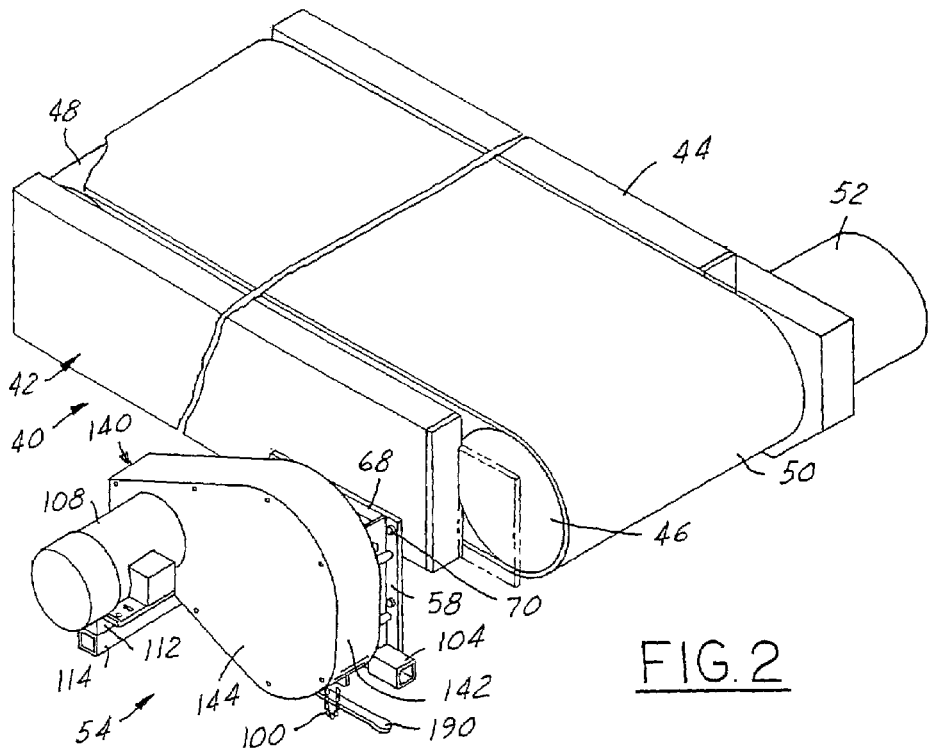
FIG. 2 is a fragmentary perspective view of a conveyor apparatus having a cantilever mounted rotary brush conveyor belt cleaner which can be mounted on either side of the conveyor.
Figure 3:
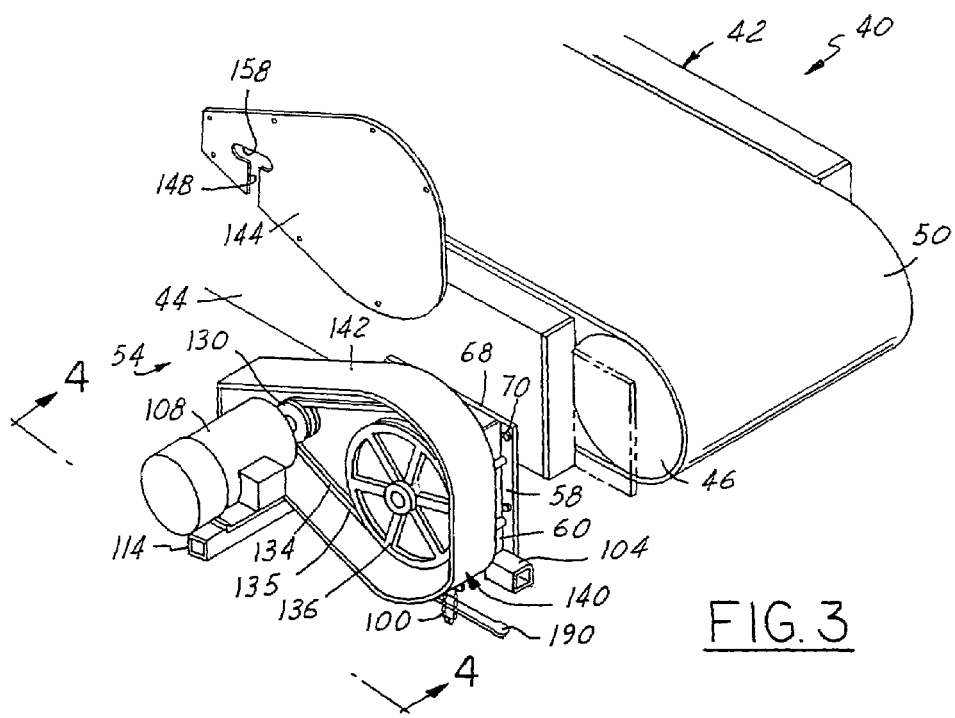
FIG. 3 is a fragmentary perspective view of a conveyor apparatus having the cantilever mounted rotary brush conveyor belt cleaner of FIG. 2, with the front panel of the belt drive cover assembly removed to expose the interior of the cover assembly.

Referring now to FIGS. 2 and 3 of the present invention, the conveyor apparatus 40 has a support or frame 42 including a pair of longitudinally extending transversely spaced apart channel or side members 44. The frame or support 40 carries at opposite ends thereof pulleys or drums 46, 48. Entrained about the pulleys 46, 48 is an endless conveyor belt 50 having upper and lower runs. First power means 52 (FIG. 2) is provided for driving pulley 46 and conveyor belt 50. The conveyor apparatus 40 has adequate space at only on one side of the conveyor for maintenance and installation purposes. A cantilever mounted rotary brush conveyor belt cleaner 54 can be mounted on either side of the conveyor apparatus 40 where there is adequate space.

Figure 8:
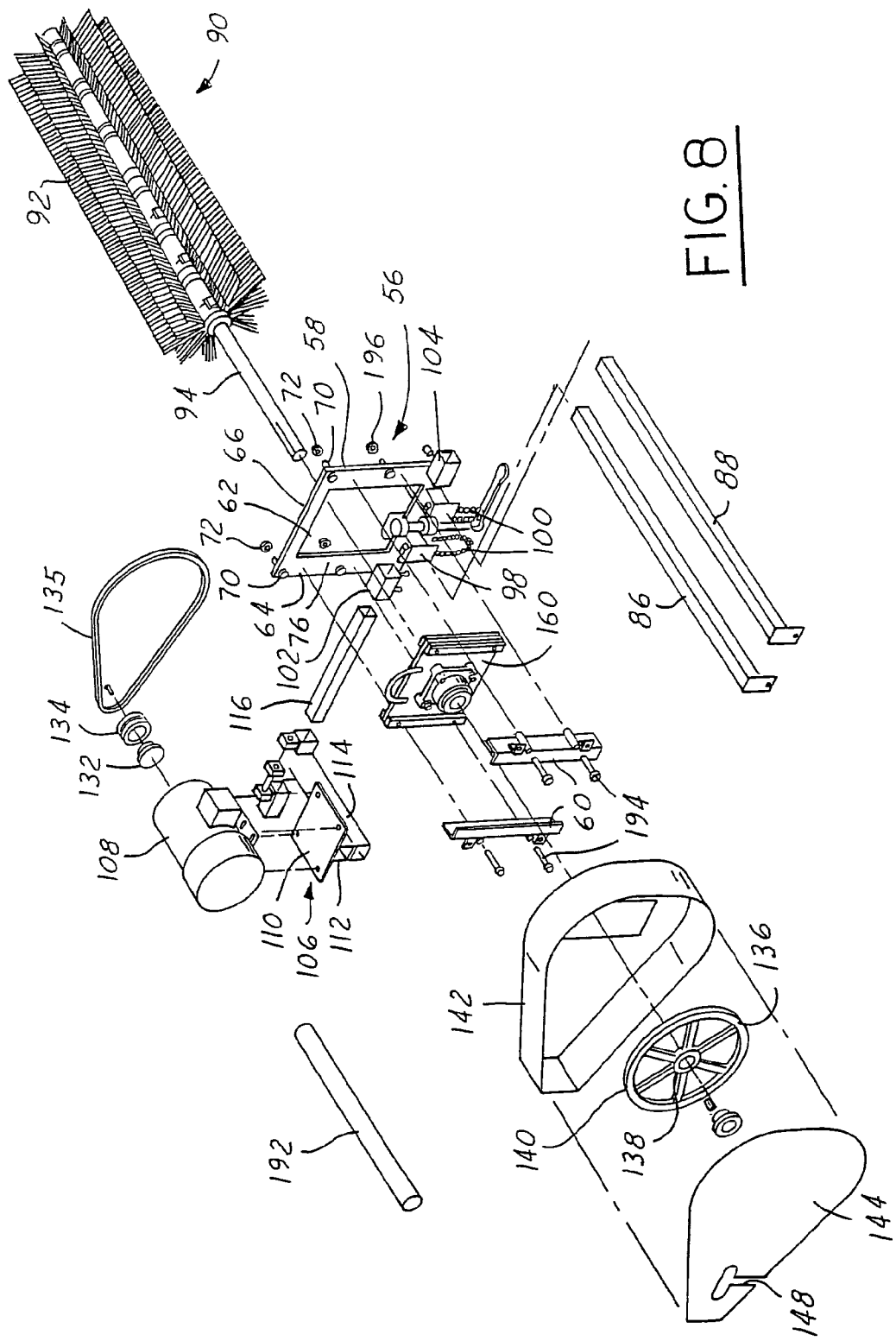
FIG. 8 is an exploded view of the component parts forming the cantilever rotary brush conveyor belt cleaner.

The cantilever mounted rotary brush conveyor belt cleaner 54, as shown in FIG. 8, includes a frame assembly 56 which has a face or mounting plate 58 and a pair of longitudinally extending vertically spaced apart angle brackets 60. The mounting plate 58 has a generally rectangular opening 62 therein which extends through the plate 58 between the front and back sides 64, 66 respectively. The mounting plate 58 is like a picture frame, with the upper horizontal portion 68 provided with bolt openings 69 to permit the plate 58 to be removably attached by bolts 70 and nut 72 to a side member 44 of the conveyor apparatus 40 as shown in FIGS. 2 and 3.

The mounting plate 58 includes the upper horizontal portion 68 mentioned previously and the lower horizontal portion 74. The upper and lower portions 68, 74 are parallel and are interconnected by the vertically extending portions 76 and 78 and together surrounds the rectangular opening 62 which completes the mounting plate 58.

The bottom or lower horizontal portion 74 is provided with two generally rectangular centrally located openings 80 which extend between the front and back sides 64, 66 of the plate 58. Located and secured in the rectangular openings 80 are a pair of tubular inserts 82, 84. The tubular inserts 82, 84 are of rectangular cross-section and are designed to receive the installation or guide tubes 86, 88 respectively which are used to assist in the installation and the removal of the cantilevered rotary brush assembly 90 including the brush 92, shaft 94 and the bearing assembly 96. When the removable installation tubes 86, 88 are not in use, the tubular inserts 82, 84 are closed by plug tubes 98 which are connected to the frame assembly 56 by chains 100. Thus, when it is necessary to use the installation tubes 86, 88, the plug tubes 98 are removed from the inserts 82, 84 and are permitted to hang freely via the chains 100 without worrying that the plug tubes 98 will be lost.

Figure 4:
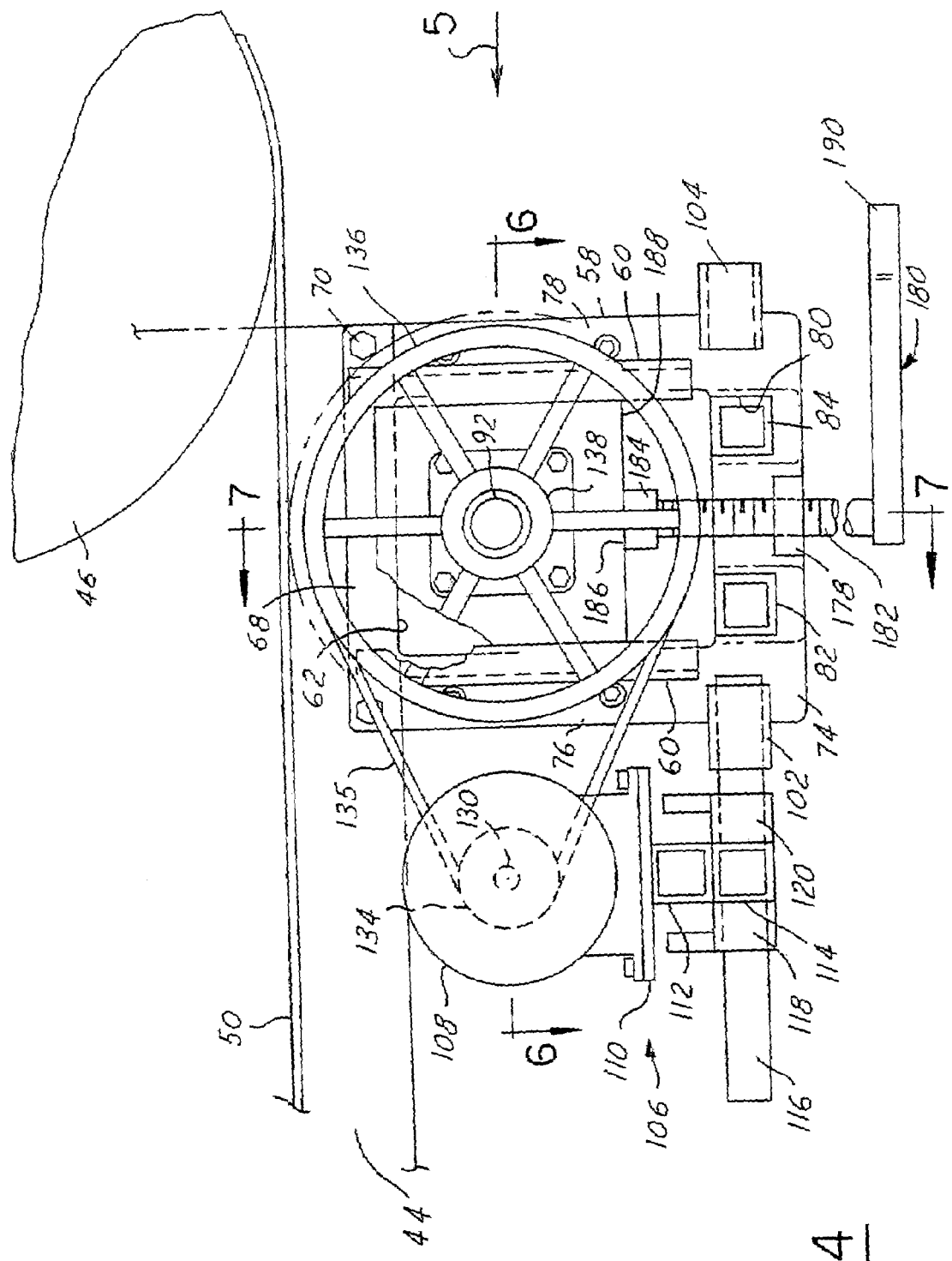
FIG. 4 is a fragmentary side elevational view of the conveyor apparatus and the cantilever mounted rotary brush conveyor belt cleaner, looking in the direction of arrows 4—4 of FIG. 3.
Figure 5:
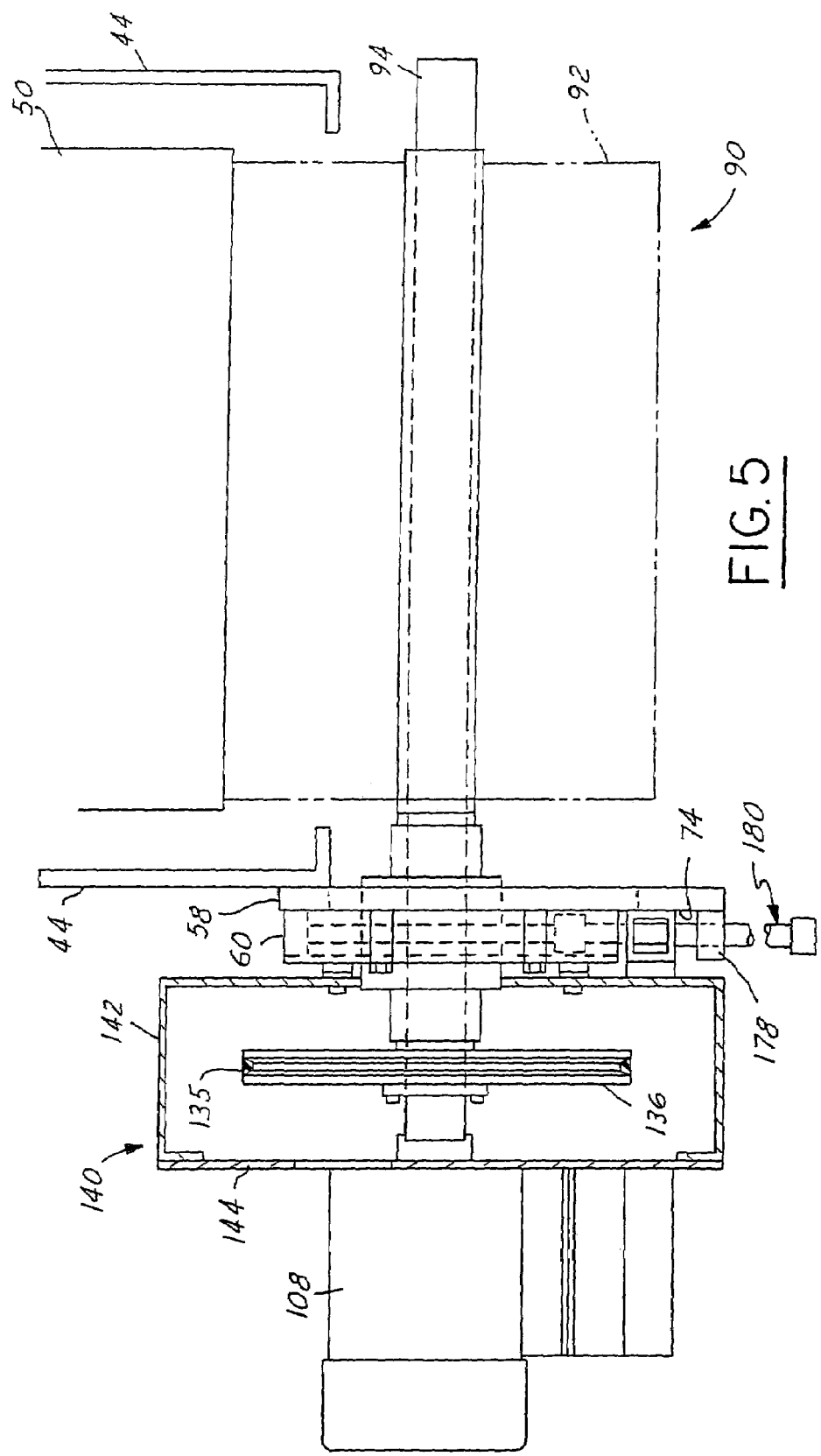
FIG. 5 is an end view of the conveyor apparatus and the cantilever rotary brush conveyer belt cleaner, with parts removed, and looking in the direction of arrow 5 of FIG. 4.
Figure 6:
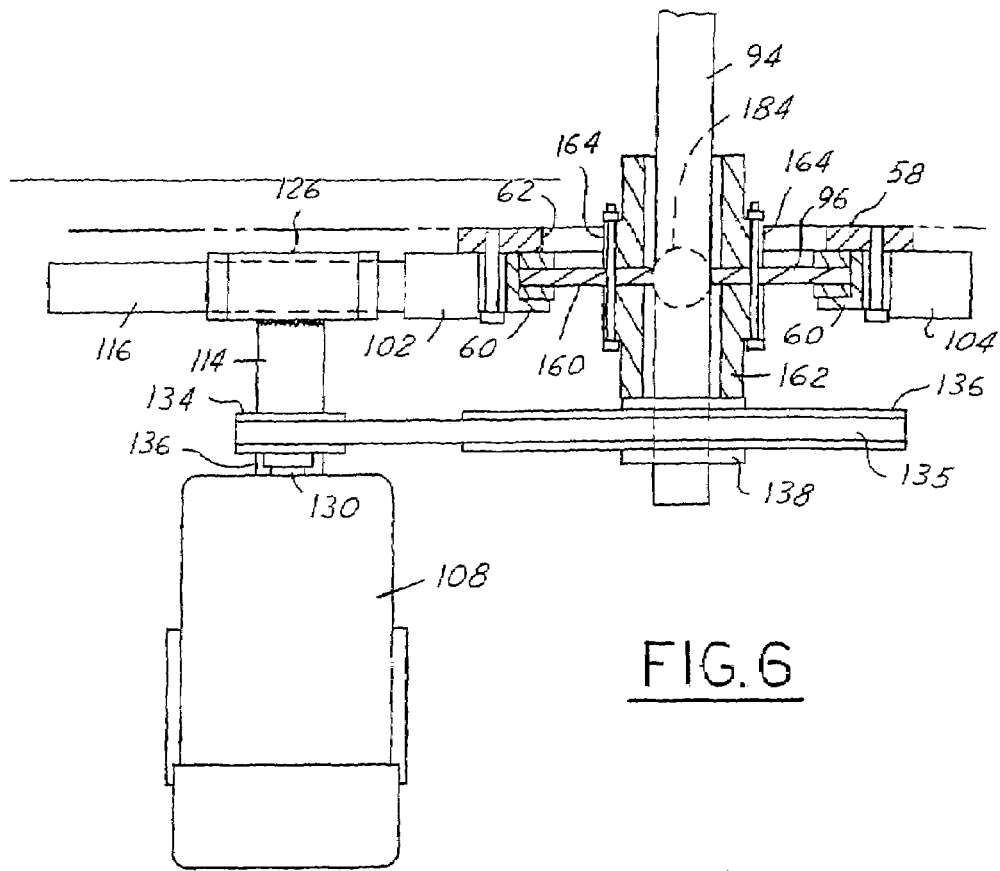
FIG. 6 is a top view of the cantilever rotary brush conveyor belt cleaner, with parts broken away, and looking in the direction of arrow 6—6 of FIG. 4.
Figure 7:
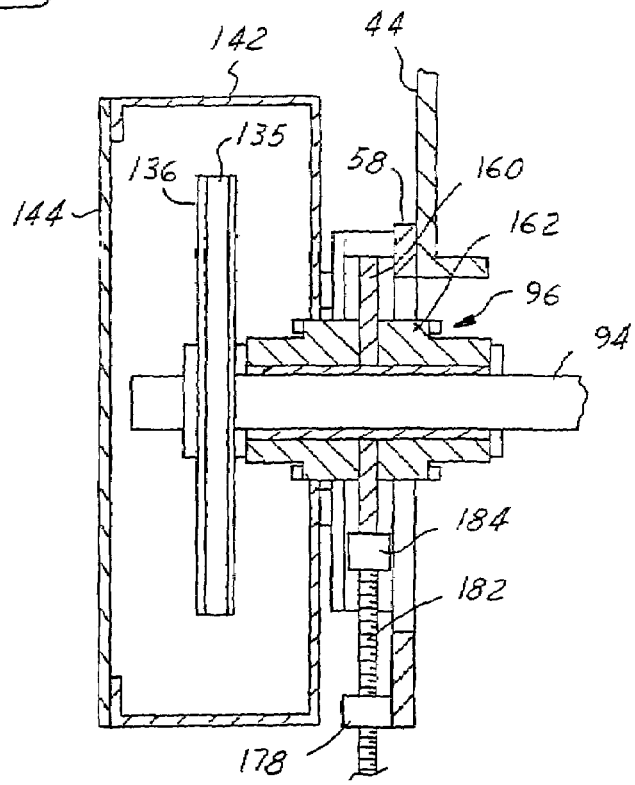
FIG. 7 is a fragmentary sectional view of the cantilever rotary brush conveyor belt cleaner taken on the line 7—7 of FIG. 4.
Figure 12:
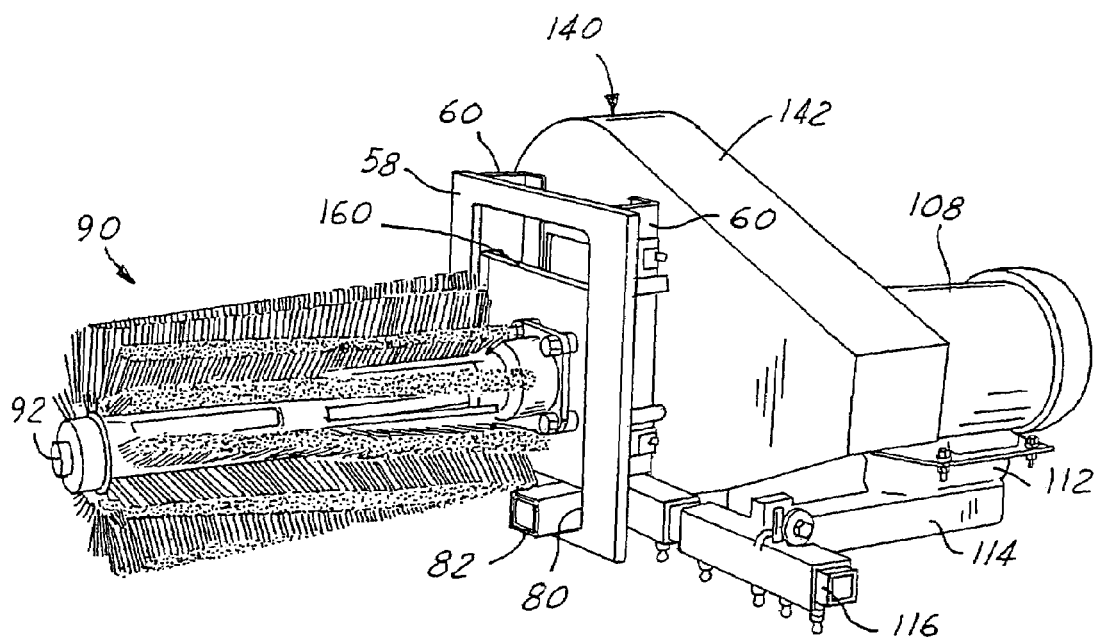
FIG. 12 is a perspective view of a cantilever mounted rotary brush conveyor belt cleaner for mounting on the opposite side of the conveyer apparatus from FIGS. 2 and 3.

The lower horizontal portion 74 of the mounting plate 58 is provided with a pair of laterally spaced apart tubular members 102, 104 which are used one at a time to support the motor support assembly 106 and the electric motor 108 for either left hand or right hand operation as best illustrated in FIG. 4. The motor mount assembly 106 includes a mount plate 110 attached to a pair of upper and lower tubular members 112, 114. The electric motor 108 include flanges for bolting the motor 108 to the mounting plate 110. The lower member 114 is longer than the upper member 112 as shown in FIGS. 6 and 12. The lower member is welded on the inner end to a tubular sleeve 126 (FIG. 6) at a 90° angle. The motor support assembly 106 further includes a support rod 116 and a pair of sleeves 118, 120. The rod 116 extends through the tubular sleeve 126.

The motor 108 has a shaft 130 upon which is mounted a bushing 132 and a drive sheave 134. A V-belt 135 is interposed between the sheave 130 and a larger sheave 136 with a hub 138 mounted on the rotary brush shaft 94. The sheave 136 has a plurality of radially extending arms 140.

As best illustrated in FIG. 3, the sheaves 134 and 136 and V-belt 135 are located within the cover assembly 140 having a housing 142 and a removable cover 144. The cover 144 is vertically slotted at 148 to permit the cover 144 to fit over the motor shaft 130 and is also horizontally slotted at 150 to provide for adjustment of the motor and sheave 130. The cover 144 is connected to housing 142 by fasteners, not shown.

Figure 11:
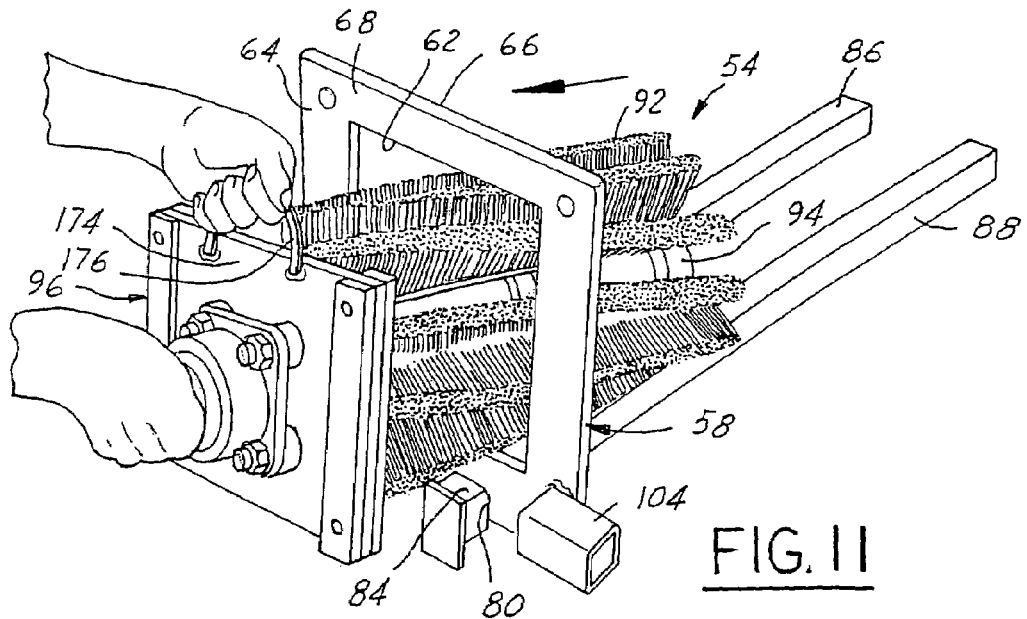
FIG. 11 is another perspective view illustrating the manner of removing the bearing support assembly, shaft and rotary brush from the frame assembly, with the assistance of the pair of installation tubes.

The bearing assembly 96 includes a vertical support or plate 160 with a centrally located bearing 162 secured at the corners to the plate 160 by fasteners 164. Each of the lateral side edges 166 of the plate 160 is provided with front and back reinforcing straps or braces 168, 170 which are secured together and to the plate 160 by fasteners 172. The bearing 162 supports the end of the shaft 94. The upper edge 174 of the plate 160 is provided with a hand strap or grip 176 for use in raising or lowering the rotary brush assembly 90 as illustrated in FIG. 11.

The front side 64 of the mounting plate 58 is provided on the lower horizontal portion 74 with a non-rotating internally threaded nut 178, FIG. 4, which forms a part of the height adjuster and ratchet mechanism 180. The mechanism 180 includes besides the nut 178, a vertically adjustable threaded post or stem 182 threadedly received in the nut 178. The upper end of the post or stem 182 has a head 184 with a flat surface 186 which abuts the lower or bottom surface 188 provided on the plate 160 of the bearing assembly 96. The lower end of the post or stem 182 has a ratchet handle 190 for ratcheting or rotating the post or stem 182 thereby raising or lowering the bearing assembly 96.

As mentioned previously, the cantilever mounted rotary brush conveyor belt cleaner can be mounted on either side of the conveyer apparatus 40, with the electric motor 108 and the cover assembly 140 mounted for either left hand or right hand usage. The mounting plate 58 of the frame assembly 56 is located directly under the head pulley 46 or other location where the conveyor belt 50 is supported against excessive vertical movement. Upon installation, the frame or mounting plate 58 is used as a template to mark and drill the mounting holes in the channel or side member 44. An opening 62 eleven inches high by nine inches wide is required for the brush assembly 90 to be inserted through the opening 62 in the mounting plate 58. Once the mounting holes have been provided in the channel member 44, bolts 70 and nuts 12 are used to secure the mounting plate 58 to the channel member 44. It is recommended that one-half inch hex head cap screws, lock-washers and nuts be utilized.

In assembling and installing the component parts, it is necessary to insert the brush shaft 92 into the bearing assembly 96. Thereafter, the rotary brush 92 is positioned on the shaft 94 so that the brush 92 will be centered under the belt 50 and head pulley 46. If the brush shaft 94 extends too far past the end of the brush 92, it is recommended that the shaft 94 be cut to the desired length.

Figure 10:
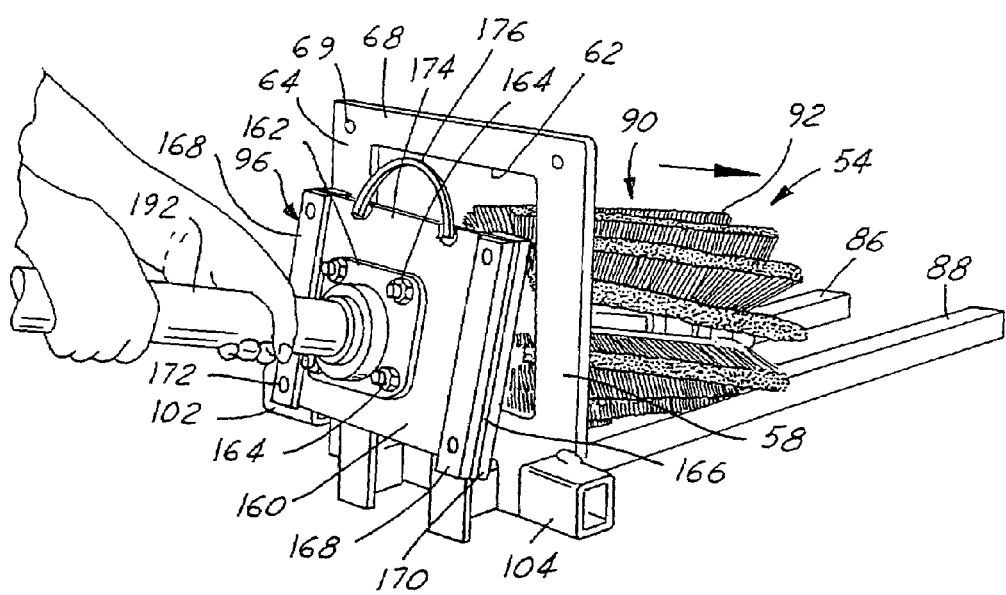
FIG. 10 is a perspective view of the installation of the bearing support assembly, shaft and rotary brush, with the aid of the pair of installation tubes and a leverage tube used on the end of the shaft to assist in raising the bearing support assembly, shaft and rotary brush.

Once the rotary brush 92, shaft 94 and bearing assembly 96 have been assembled, the assembled unit is ready for insertion through the rectangular opening 62 provided in the mounting plate 58 which has been previously mounted on the channel member 44 of the conveyor apparatus 40. To assist in the installation, the guide tubes 86 and 88 are inserted through the guide blocks or tubular inserts 82 and 84 carried by the mounting plate 58. The installation guides or tubes 86, 88 assist in installing as well as removing the rotary brush assembly 90. The height adjustor and ratchet mechanism 180 must be completely lowered so as to not interfere with the installation of the rotary brush assembly 90. Thereafter, the rotary brush assembly 90 is inserted through the frame opening 62. The bearing assembly 96 rests on the pair of guide blocks located on top of the guide tubes. A leverage tube 192 is provided to assist the mechanic in the installation of the rotary brush assembly 90. The leverage tube 192 is placed over the end of the shaft 92 as illustrated in FIG. 10. The mechanic places both hands on the tube 192 and moves the rotary brush assembly 90 forwardly applying leverage to the rotary brush assembly 90 and the bearing assembly 96. Such action is guided or assisted by the installation tubes 86, 88. During such operation, the rotary brush assembly 90 is centered with respect to the frame opening 62.

Figure 9:
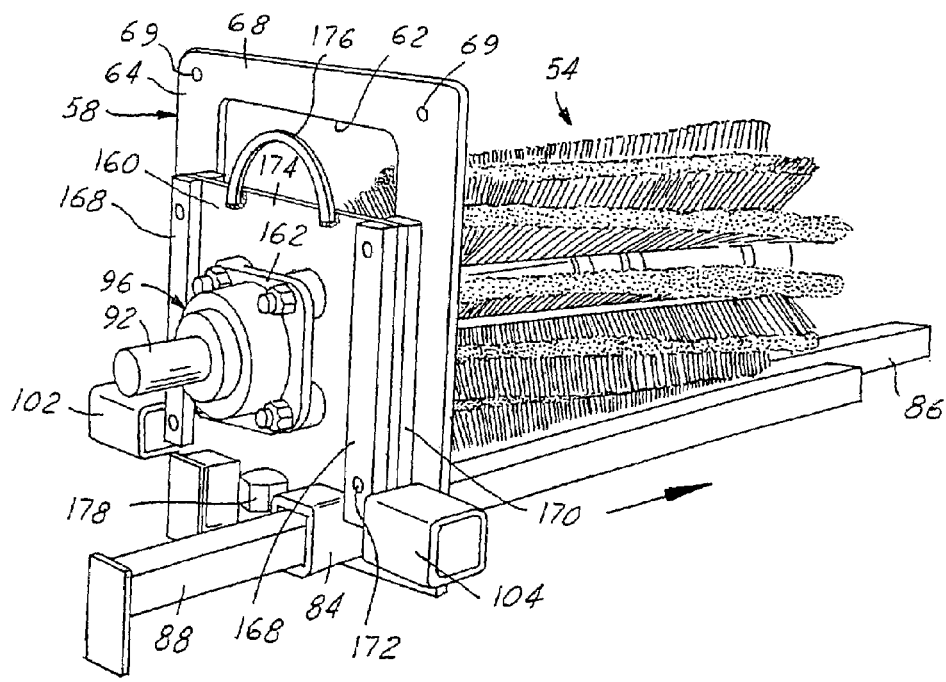
FIG. 9 is a perspective view illustrating the method of mounting the bearing support assembly on the shaft and thereafter installing the rotary brush through the opening provided in the mounting plate of the frame assembly, utilizing a pair of removable installation tubes to guide the brush.

Once the rotary brush assembly 90 and bearing assembly 96 have been moved to the position illustrated in FIG. 9, it is necessary to place the angle brackets 60 of the frame assembly 56 around the lateral side edges 166 of the bearing assembly 96 and to thereafter secure the angle brackets 60 and the bearing assembly 96 to the mounting plate 58 of the frame assembly by means of the bolts 194 and the nuts 196 (FIG. 8). Once the angle brackets 60 of the frame assembly 56 have been secured to the mounting plate 58 to appropriately center and mount the bearing assembly 96 and the rotary brush assembly 90, it is necessary to take the motor mount assembly 106 and to mount and to secure it to the frame assembly 56. This is accomplished by placing the motor support arm 116 into the support arm tube or tubular member 102 or 104 depending on whether the unit is to mounted on the left hand or right hand side of the frame 42. Thereafter the electric motor 108 is attached by fasteners to the mounting plate 110. It is then necessary to select the drive sheave 134 based on the belt speed or desired brush speed and to mount the drive sheave 134 and bushing 132 on the motor shaft 130. The larger sheave 136 is mounted on the shaft 94 of the rotary brush assembly 90. With such a construction, the drive sheave 134 should line up with the motor shaft sheave 136 as shown in FIG. 3. The electric motor 108 is wired so as to rotate the rotary brush 92 against the travel of the conveyor belt 50. The brush 92 is also wired to turn off and on with the operation of the conveyor apparatus 40.

In replacing the rotary brush 92, it is necessary to first remove the electric motor 108. It is then necessary to remove the plug tube 98 and to thereafter insert the tube brush guides 86, 88 into the tubular inserts 82, 84. It is then required to remove the angle brackets 60 forming part of the frame assembly 56. This is followed by the removal of the brush 92, shaft 94 and bearing assembly 96 with the assistance of the guide tubes 86, 88. To reinstall the rotary brush 92, shaft 94 and bearing assembly 96, it is recommended that the leverage tube 192 and the brush guide tubes 86, 88 be utilized to assist in the installation. The final step is to use the leverage tube 192 to tilt the rotary brush assembly 90 upright for bolting to the flange. It is recommended that the rotary brush 92 be a helical brush since it has proven to be the most efficient brush when used to clean conveyor belts. With the present invention, it is easy to install the rotary brush 92, shaft 94 and bearing assembly 96 from one side of the conveyor apparatus 40. This permits adjustment to be made from only one side of the conveyor apparatus. In addition, all maintenance will be conducted from one side of the apparatus. With the features just described, the cantilever mounted rotary brush conveyer best cleaner 54 fits into tight or limited spaces.

The brush unit of FIG. 1 is mounted or attached on both sides of the conveyor 10 below the head pulley 116. This mounting arrangement requires that the mechanics adjust the unit from each side of the conveyor. It also requires a large amount of disassembly when bristle strips of the brush are replaced.

The features of the new cantilever mounted brush type conveyor belt cleaner will appeal to users and include the mounting from one side, adjusting from one side, and servicing from one side of the conveyor belt. These three features make the unit unique when compared to existing conveyor belt brush cleaners. One of the unique design features of this unit is shown in FIGS. 9–11 which illustrate the removal and installation of the rotary brush unit 90. As can be seen, temporary supports 86, 88 are placed under the brush 92. The two supports 86, 88 permit the brush assembly 90 to easily be removed and replaced. The supports 86, 88 can either be removed after maintenance or left in place.

The foregoing descriptions are directed to particular embodiments of the invention for the purpose of illustration and explanation. It will be apparent, however, to one skilled in the art that many modifications and changes to the embodiments set forth above are possible without departing from the scope and spirit of the invention. It is intended that the following claims be interpreted to embrace all such changes and modifications.

What is claimed is:

1. A conveyor apparatus comprising:
   a support;
   a pair of pulleys carried by said support;
   an endless conveyor belt having upper and lower runs extending around said pulleys;
   first power means for driving one of said pulleys and said conveyor belt;
   a cantilever mounted rotary brush conveyor belt cleaner assembly mounted on one side of said support and extending below the lower run of said conveyor belt, said rotary brush conveyor belt cleaner assembly having a shaft with a pair of ends, and a rotary brush mounted on said shaft;
   a bearing support assembly supporting one end of said shaft, with the other end of said shaft being unsupported;
   said rotary brush and shaft extending transversely across and below said lower run for engaging and cleaning the lower run of said endless conveyor belt when driven by said first power means; and
   second power means for rotating said shaft and said rotary brush.

2. The conveyor apparatus as recited in claim 1, wherein said rotary brush conveyor belt cleaner assembly further comprises:
   a frame assembly having a mounting plate with a rectangular opening through which said brush assembly extends for engaging the lower run of said conveyor belt;
   first fastening means for connecting said mounting plate to said support;
   said bearing support assembly being located on and abutting one side of said mounting plate;
   said frame assembly including a pair of vertically extending laterally spaced angle brackets for enclosing opposing edges of said bearing support assembly; and
   second fastening means for securing said angle brackets to said mounting plate to hold said bearing assembly in a stationary position against said mounting plate.

3. The conveyor apparatus as recited in claim 2, wherein said rotary brush includes a plurality of spaced apart bristles extending lengthwise on said shaft and arranged on a helix.

4. The conveyor apparatus as recited in claim 2, wherein the bottom of said mounting plate below said rectangular opening is provided with a pair of relatively short tubular inserts which extend through said mounting plate, said tubular inserts receiving installation tubes which are temporarily mounted therein for assisting in the insertion of said rotary brush through said rectangular opening, beneath the lower run of said conveyor belt;
   said installation tubes being removed from said tubular inserts after said rotary brush and said bearing support assembly have been installed and the angle brackets of said frame assembly have been attached to said mounting plate.

5. The conveyor apparatus as recited in claim 4, wherein said frame assembly is located on said support near the center line of one of said pulleys.

6. The conveyor apparatus as recited in claim 1, wherein said second power means includes an electric motor which is carried by said frame assembly;
   said electric motor having a belt driven connection to said shaft for rotating said shaft and said rotary brush.

7. The conveyor apparatus as recited in claim 2, wherein said first fastening means are a plurality of removable nuts and bolts removably secured to said support.

8. The conveyor apparatus as recited in claim 2, wherein said second fastening means are a plurality of removable nuts and bolts.

9. The conveyor apparatus as recited in claim 2, wherein a vertically extending and movable adjustment screw is carried by said frame assembly and abuts the bottom of said bearing support assembly for varying the pressure of said rotary brush on said conveyor belt.

10. The conveyor apparatus as recited in claim 2, wherein said mounting plate below said rectangular opening is provided with a pair of tubular mounting elements;
    a motor support assembly including an arm received in said mounting elements;
    said motor support assembly having a tubular sleeve mounted on said arm;
    said sleeve having a motor mount plate; and
    said second power means including an electric motor secured to said mount plate.

11. The conveyor apparatus as recited in claim 4, wherein after said installation tubes have been removed, said tubular inserts are each closed by a plug tube which is inserted in the corresponding insert;
    each plug tube being connected to the frame assembly by a chain to prevent loss of the plug tube.

12. The conveyor apparatus as recited in claim 4, wherein a removable leverage tube is placed over said one end of said shaft to assist said installation tubes in installing or removing said bearing support assembly and said cantilever rotary brush.

13. A cantilever mounted rotary brush conveyor belt cleaner comprising:
- a shaft;
- a rotary brush mounted on said shaft;
- a bearing support assembly supporting one end of said shaft, with the other end being unsupported;
- a frame assembly having a mounting plate with inner and outer surfaces and with a rectangular opening therein between said surfaces and through which said shaft and rotary brush extends;
- said bearing support assembly being located on and abutting one of said surfaces of the mounting plate and said rotary brush being located opposite the other of said surfaces of said mounting plate;
- said frame assembly including a pair of vertically extending laterally spaced angle brackets for enclosing opposing edges of said bearing support assembly;
- fastening means for securing said angle brackets to said mounting plate to hold said bearing assembly in a stationary position against said mounting plate; and
- power means for rotating said shaft and rotating brush.

14. The cantilever mounted rotary brush conveyor belt cleaner as recited in claim 13, wherein said rotary brush includes a plurality of spaced apart bristles extending lengthwise on said shaft and arranged on a helix.

15. The cantilever mounted rotary brush conveyor belt cleaner as recited in claim 13, wherein the bottom of said mounting plate below said rectangular opening is provided with a pair of relatively short tubular inserts which extend through said mounting plate;
- said tubular inserts receiving installation tubes which are temporarily mounted therein for assisting in the insertion of said rotary brush through said rectangular opening;
- said installation tubes being removed from said tubular inserts after said rotary brush, said bearing support and said frame assembly have been assembled.

16. The cantilever mounted rotary brush conveyor belt cleaner as recited in claim 13, wherein a electric motor is carried by said frame assembly and has a belt driven connection to said shaft or rotating said shaft and said rotary brush.

17. The cantilever mounted rotary brush conveyor belt cleaner as recited in claim 13, wherein said mounting plate below said rectangular opening is provided with a pair of tubular mounting elements;
- a motor support assembly including an arm received in said mounting elements;
- said motor support assembly having a tubular sleeve mounted on said arm;
- said sleeve having a motor mount plate; and
- said power means including an electric motor mounted on said motor mount plate.

18. The cantilever mounted rotary brush conveyor belt cleaner as recited in claim 15, wherein after said installation tubes have been removed, said tubular inserts are each closed by a plug tube which is inserted in the corresponding insert;
- each plug tube being connected to the frame assembly by a chain to prevent loss of the plug tube.

19. The cantilever mounted rotary brush conveyor belt cleaner as recited in claim 15, wherein a removable leverage tube is placed over said one end of said shaft to assist said installation tubes in installing or removing said bearing support assembly and said rotary brush from said mounting plate.

* * * * *